Sept. 8, 1931.   C. BIRDSEYE ET AL   1,822,123
REFRIGERATING APPARATUS
Filed July 1, 1929   2 Sheets-Sheet 1

INVENTOR
Clarence Birdseye
and
Bicknell Hall
by H.H.Jenney Atty

Sept. 8, 1931. C. BIRDSEYE ET AL 1,822,123
REFRIGERATING APPARATUS
Filed July 1, 1929 2 Sheets-Sheet 2

INVENTOR
Clarence Birdseye and Bicknell Hall.
by H. W. Kenway Atty

Patented Sept. 8, 1931

1,822,123

UNITED STATES PATENT OFFICE

CLARENCE BIRDSEYE AND BICKNELL HALL, OF GLOUCESTER, MASSACHUSETTS, ASSIGNORS, BY MESNE ASSIGNMENTS, TO FROSTED FOODS COMPANY, INC., OF DOVER, DELAWARE, A CORPORATION OF DELAWARE

REFRIGERATING APPARATUS

Application filed July 1, 1929. Serial No. 375,046.

This invention relates to refrigerating apparatus adapted for freezing, quick-freezing or chilling food products to any desired degree of congelation Food products are quick-frozen most successfully between heat-conductive members which firmly engage the product upon opposite sides over a substantial area thereof, thus establishing intimate contact and ensuring uniform and rapid interchange of heat between product and the heat-conductive members. Among other desirable factors, it is important that the unfrozen product should be engaged with a measured degree of pressure between appropriate limits such that, on the one hand, the shape of the product in its package or container may be maintained without distortion by crushing, but on the other hand, it should be engaged with sufficient pressure to cause the expansion of the product in freezing to take place internally, closing the voids in the product and thus solidifying the mass thereof. Provision should also be made for supplying an ample quantity of cooling medium to the heat-conductive members at a relatively low temperature to maintain a pronounced temperature difference between the product and the surfaces engaging it, and thus ensure rapid heat interchange. The construction of the apparatus should also facilitate the presentation of the unfrozen product and the removal of the frozen product.

The present invention contemplates refrigeration apparatus embodying the desirable characteristics above discussed and others as will presently appear. In one aspect, accordingly, it comprises refrigeration apparatus in which rigid heat-conducting members are arranged for relative movement to engage between them food products in any desired form, such members being associated with means for supplying cooling medium thereto in all relative positions.

Our invention contemplates apparatus of large refrigerating capacity, so designed as to occupy a relatively small amount of floor space and being, therefore, adapted for installation in plants of medium size, on board vessels, or in any location where limited areas are available. We have discovered that the desired results may be achieved by providing a series of heat-conductive plates disposed in parallel relation and in substantial alignment and arranged to be contracted or expanded as a series. In the expanded position of the series, the product to be frozen may be delivered to the apparatus by presenting it between the spaced plates, whereupon the series may be contracted as a whole so that the plates engage and press the interleaved product. By supplying a cooling medium to the plates while the product is thus held, the product may be frozen by the absorption of heat from both sides simultaneously through the agency of the heat-conductive plates. Where the product is presented in units of approximately uniform size, as for example packaged in a carton, a relatively slight separating movement of the heat-conductive plates and expansion of the series as a whole is required to permit the insertion of the product and a corresponding slight contraction of the series is sufficient to subject the interleaved product to the desired pressure. It is practical, therefore, to employ a substantial number of heat-conductive plates in a stack or in vertical series without reaching a height in the least inconvenient for the presentation and removal of the product. It will be apparent that the refrigerating efficiency of apparatus constructed in this manner is favorably effected because each plate of the series, except the top and bottom plates, acts to refrigerate a product positioned in contact with both of its faces and each unit of product is cooled from opposite sides simultaneously.

These and other features of the invention will be best understood and appreciated from the following description of a preferred embodiment thereof, selected for purposes of illustration and shown in the accompanying drawings, in which Fig. 1 is a view of the apparatus in side elevation, showing the refrigerating chamber and certain parts in section;

Figure 1:
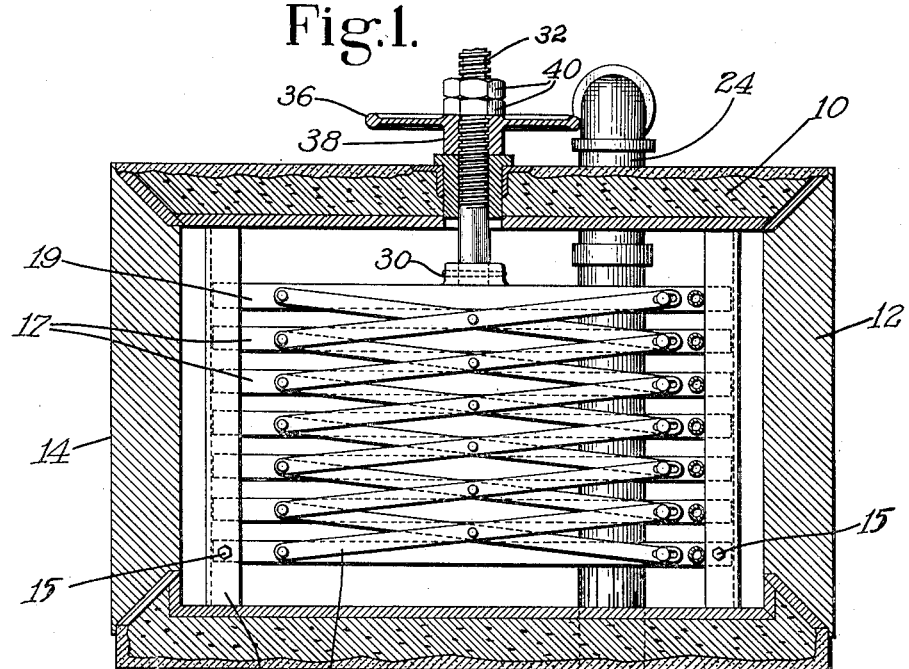

For purposes of illustration we have shown the apparatus as enclosed in an insulated chamber 10, the walls of which comprise outer and inner casings and a filling of ground cork or other heat insulating material. The chamber is provided at one side with a door 12 and at the opposite side with a door 14 and is otherwise imperforate except for the pipe connections of the cooling system, to be presently described. The character of the insulating enclosure is of secondary importance only, although for economy of refrigeration it is desirable to install the apparatus under conditions which will reduce heat loss from the apparatus to a minimum.

Within the insulated chamber 10 is provided a multiple series of heat-conductive plates. The lowest plate 18 of the series is stationary and fixed in position by bolts 15 extending through vertical angle irons 16 which extend from the top to the bottom of the insulated chamber, enclosing the corners of the plates 17 and constituting guiding means therefor.

The uppermost plate 19 of the series is provided upon its upper surface with a boss 30 from which projects a threaded shaft 32. The shaft 32 projects upwardly and freely through a bushing 34 inserted in the top of the insulated chamber, and is provided with a hand wheel 36 having its hub 38 formed as a nut. It will be seen that by turning the hand wheel 36 the threaded shaft and the plate 19 to which it is connected will be raised or lowered. Check nuts 40 are provided upon the upper end of the shaft for limiting its downward movement and so determining the lowermost position of the upper plate.

Between the lower stationary plate 18 and the upper movable plate 19 is interposed a series of plates 17. At opposite ends all the plates of the series, including the top and bottom plates, are connected by a lazy tongs linkage 21, which operates to maintain the plates always in parallel relation and to control their movement in a graduated manner when the plate 19 is moved. The effect of this mechanism is to maintain the spacing of the plates equal for all degrees of separation and maintain the distribution of the plates in the series uniform and symmetrical throughout the expansion or contraction of the series as a whole.

The two systems of lazy tongs linkage 21 are located at the opposite ends of the series of plates, leaving the sides of the plates opposite the doors 12 and 14 of the insulated chamber 10 free and unobstructed, so that the product to be frozen may be pushed upon the plates through one door and pushed off the plates after it has been frozen through the other door.

Figure 3:
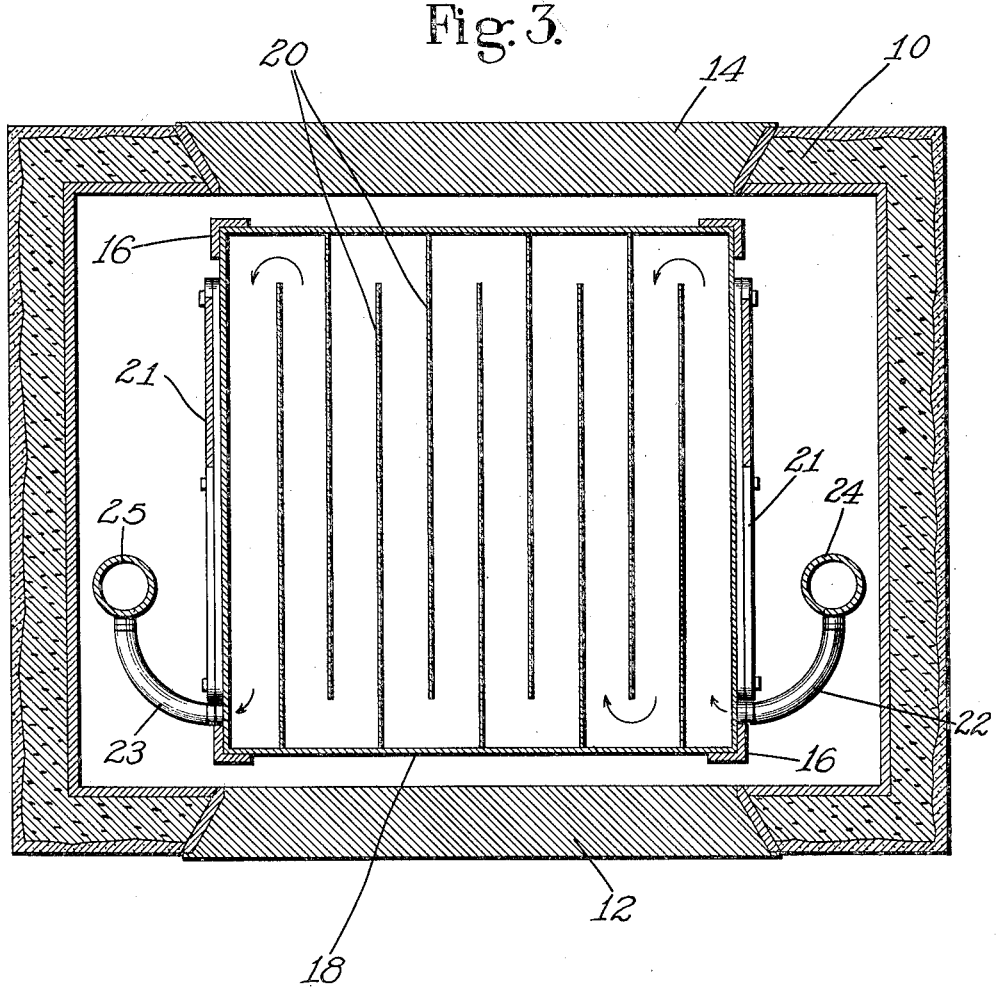
Fig. 3 is a view in cross section on the line 3—3 of Fig. 2.

The individual plates 17, 18 and 19 are substantially identical in construction and constitute shallow rigid heat-conductive members. Each comprises a hollow metallic frame or box having staggered baffle plates 20, as shown in Fig. 3, forming in each plate a sinuous passage for directing a cooling medium over its entire area.

Cooling medium is supplied by a pipe 24 which enters the insulated chamber through the top thereof and is connected to each individual plate by flexible tubes 22 which permits movement of the plates with reference to the pipe 24 without interrupting the circulation of the cooling medium. Similarly, cooling medium is discharged through a pipe 25, passing out of the insulated chamber 10 through the bottom thereof and connected to the individual plates by flexible connections 23.

The apparatus herein shown is well-adapted to be operated with calcium chloride brine as a cooling medium and satisfactory results are secured when this is supplied in a concentration of about 33° Baumé and maintained at an average temperature of 45° below zero F. The precise nature of the cooling medium, however, is of secondary importance and we contemplate the use of liquid carbon dioxide or other liquefied gas which, if desired, may be expanded directly into the heat-conductive plates should this be found more convenient or effective.

In using calcium chloride brine, it will be understood that this is continuously supplied through the inlet pipe 24 from a refrigerating machine, circulated independently through the heat-conductive plates, and returned through the outlet pipe 25 to the refrigerating machine to be re-cooled in a continuous uninterrupted cycle.

Figure 2:
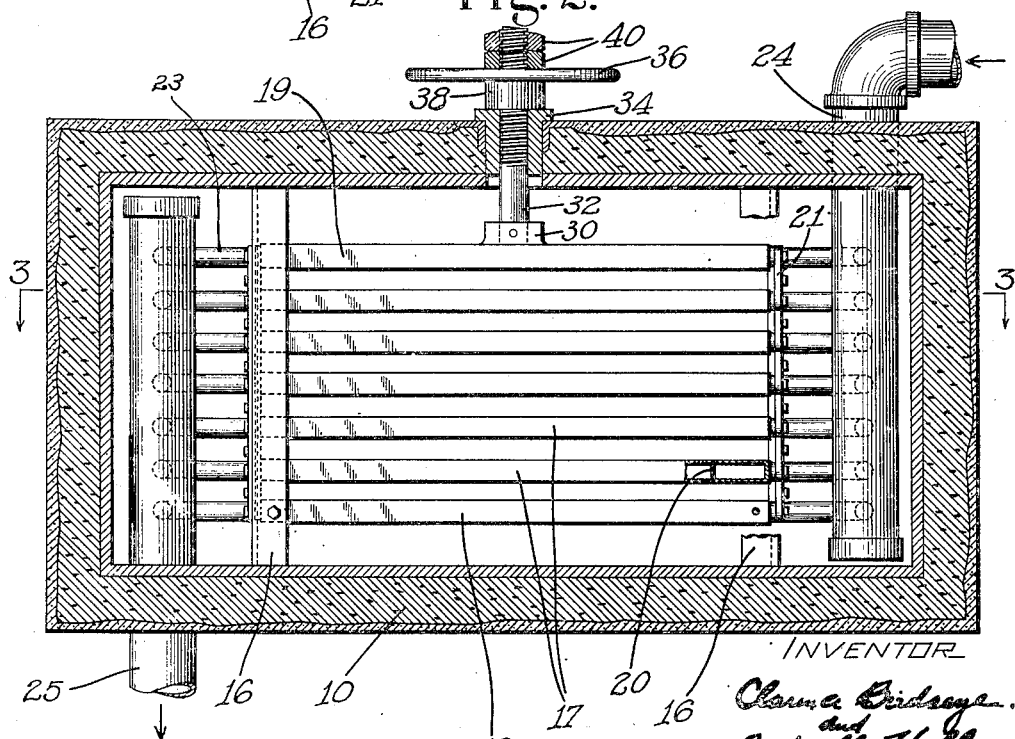
Fig. 2 is a similar view in end elevation.

In using the apparatus herein disclosed, the hand wheel 36 is turned to elevate the top plate 19 and to separate all of the plates in the series. The product to be frozen is then introduced as a charge through the door 12 and arranged upon the upper surface of the plates 17 and 18. It is, of course, desirable that the product should be introduced in units of approximately equal thickness and that the entire area of the supporting plates be utilized. Any food product prepared in consumer packages may be treated with particular facility in the illustrated apparatus. Having thus delivered a charge to the apparatus, the hand wheel 36 is turned reversely until the check nuts 40 engage the hub of the hand wheel, as shown in Figs. 1 and 2, stopping the downward movement of the plates 18 and 19 or limiting the contraction of the series as a whole.

The product to be frozen, which is usually in a more or less soft and pliable condition, is thus interleaved between the heat-conductive plates and engaged by them with the predetermined amount of pressure best suited for the requirements of the case. The door 12 is then closed and the quick-freezing operation takes place. The interval required for this, of course, depends upon the condition of the product to be frozen, and upon the temperature and quantity of the cooling medium circulated through the heat-conductive plates. In any case, however, the quick-freezing operation can be carried out simultaneously from both sides of the interleaved product and with a high degree of efficiency. After an interval sufficient for the freezing operation, the hand wheel 36 is turned in the direction to lift the top plate 19 and expand the series of plates, thus releasing the frozen product from pressure. The doors 12 and 14 are then opened and the frozen product may be pushed through between the plates from one side or the other and removed for storage or shipment.

The heat-conductive plates may be made sufficiently heavy to exert by their weight the maximum desired pressure upon the product; any less pressure may be secured by manipulating the hand wheel 36 so as slightly to lift the plates or reduce their pressure upon the interleaved product.

In its broader aspects, we have claimed the invention herein disclosed in our co-pending Application Serial No. 518,060, filed February 25, 1931, as a continuation in part of the present application. The claims herein presented are, accordingly, restricted to organizations in which the weight of the heat-conductive plates is relied upon to exert pressure upon the products to be frozen.

Having thus described our invention, what we claim as new and desire to secure by Letters Patent is:

1. A refrigerating apparatus comprising a stationary heat-conductive plate, a similar plate disposed in opposition thereto, means for moving said latter plate toward or from the stationary plate, a series of spaced interposed plates all suspended from said movable plate and movable simultaneously therewith to engage interposed products by gravity, and means for supplying cooling medium to said plates.

2. Refrigeration apparatus for food products, comprising a stationary supporting plate, and a plurality of vertically movable heat-conductive plates arranged to be raised and lowered above the supporting plate, connections whereby each plate is permitted to exert the pressure of its weight only upon a product supported by the plate below, said plates being hollow for the passage therethrough of a refrigerating medium, and means for circulating refrigerating medium through said plates regardless of the position thereof, whereby the products engaged between said plates will be refrigerated.

3. A refrigerating apparatus comprising a refrigerating chamber having a door in one side, a stack of substantially horizontal and cooperating heat-conducting supports arranged therein for relative movement to receive and press therebetween a product to be refrigerated, means whereby the supports can be lifted for receiving said product and then released to exert their weight only upon the same, and means for circulating a cooling medium through said supports.

4. A refrigerating apparatus comprising a refrigerating chamber having a door in one side, a series of cooperating heat-conducting supports arranged therein for relative movement to receive and press therebetween a product to be refrigerated, means operative from a position outside the chamber for lifting the supports for receiving said product and for releasing the supports to exert their weight only upon the product, and means for circulating a cooling medium through said supports.

5. Apparatus for quick-freezing food products comprising a number of parallel heat-conductive plates arranged in vertical series, and positively acting means for lifting the superposed plates of the series to permit the introduction of products to be frozen therebetween, said means being operative to release the superposed plates so that they may rest freely upon the interposed product, thus subjecting the same to a pressure of limited amount.

In testimony whereof we affix our signatures.

CLARENCE BIRDSEYE.
BICKNELL HALL.